Dec. 9, 1947.   L. F. CARTER ET AL   2,432,089

VARIABLE CAPACITY PICK-OFF FOR COMPASS SYSTEMS

Original Filed Nov. 6, 1941

INVENTORS
LESLIE F. CARTER
FRANCIS WEST, JR.
BY Herbert J. Thompson
ATTORNEY.

Patented Dec. 9, 1947

2,432,089

UNITED STATES PATENT OFFICE 2,432,089

VARIABLE CAPACITY PICK-OFF FOR COMPASS SYSTEMS

Leslie F. Carter, Leonia, N. J., and Francis West, Jr., Westbury, N. Y., assignors to Sperry Gyroscope Company, Inc., Brooklyn, N. Y., a corporation of New York Original application November 6, 1941, Serial No. 418,032. Divided and this application January 22, 1944, Serial No. 519,360

8 Claims. (Cl. 175—41.5)

This invention relates to a capacity pick-off adapted to be driven by a reference member such, for example, as the magnetic needle of a magnetic compass and to be connected in circuit with a repeater device for reproducing directional indications afforded by the magnetic compass.

This application is a divisional of our copending application Serial No. 418,032, filed in the U. S. Patent Office on or about November 6, 1941, and which matured into Patent No. 2,363,500.

It is a first object of the present invention to provide a condenser type pick-off and one which is particularly adapted for use as a pick-off for a compass having a magnetic element sensitive to a magnetic field, the condenser being adapted for connection in balancing circuits of a compass repeater system and being so constructed and arranged as to permit of adjustment whereby the repeater will closely follow the directional indications afforded by the magnetic compass without substantial lag or other errors.

More particularly, it is an object of the present invention to provide a condenser pick-off including stator and rotor plates which are mounted for relative movement in cooperably spaced relation, and which condenser includes means for adjusting the capacity thereof for given relative positions of the stator and rotor plates.

A still further object resides in providing a condenser pick-off of the above character, said pick-off including fixed and adjustable plate elements adapted to be connected in the several balancing circuits of a repeater system whereby lag or other errors, which may be due to external causes of a constant nature, may be substantially eliminated by adjustment of the pick-off plates, and faithful repeating or reproduction by the repeater device will result.

With the foregoing and still other objects in view, our invention includes the novel elements, correlation and relative arrangement of parts described below and illustrated in the accompanying drawings, in which—

Figure 1:
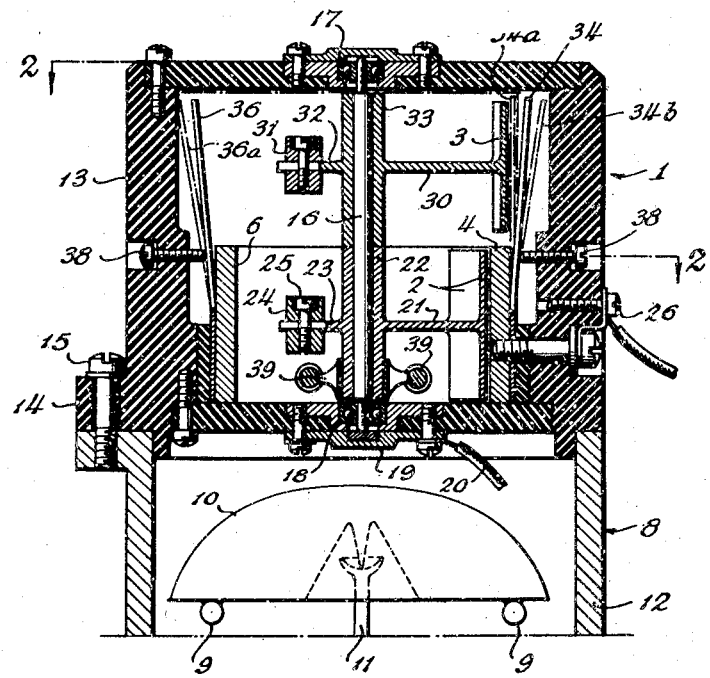
Figure 2:
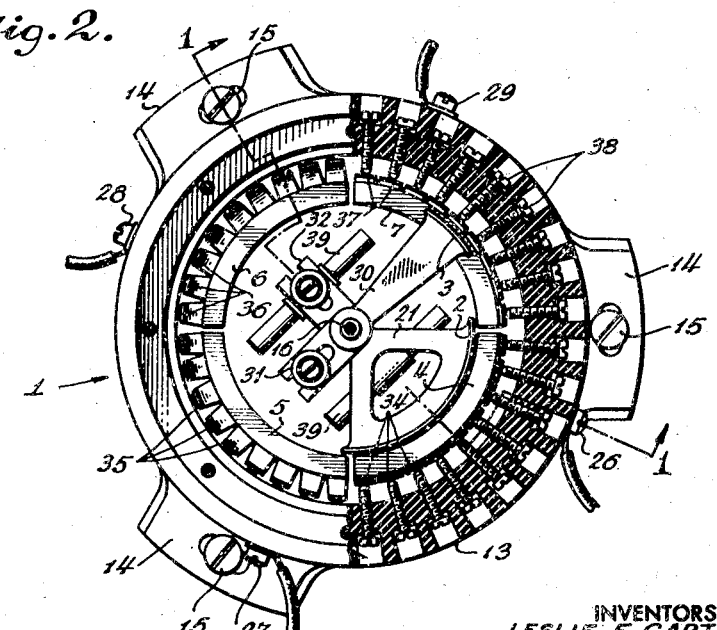

Fig. 1 is a sectional elevation view of our preferred form of capacity pick-off, taken in about the plane 1—1 of Fig. 2, and illustrating it in association with a magnetic compass shown in fragmentary section; and Fig. 2 is a plan view, partially in section of our pick-off, taken in about the plane 2—2 of Fig. 1.

Referring to the drawings wherein we have illustrated a preferred embodiment of our condenser pick-off, we have shown the pick-off generally indicated at 1 associated with a magnetic compass indicated generally at 8. In the embodiment shown, the magnetic compass comprises a pair of bar magnets 9 which are pendulously supported by means of a float 10 on a support 11. It will be understood that the casing 12 of the compass may be filled with a suitable damping fluid to dampen oscillations which may be set up. In the embodiment illustrated, the condenser pick-off is mounted on top of the compass housing or bowl. The condenser housing 13 is preferably formed of electrical insulating material molded in the form of a cylinder and provided with slotted leg portions 14. These slotted leg portions on the casing provide for the adjustable connection of the condenser housing to the compass bowl 12, studs 15 or other suitable connecting parts being employed for this purpose. Movable plates 2 and 3 of the condenser are secured to a centrally located shaft 16, the ends of which are supported and rotate in ball-bearings 17 and 18. In practice, of course, we prefer to use jewel bearings for the shaft. One end of shaft 16, such as the lower end thereof rests on a contacting piece 19 which is electrically insulated from the stator plates but connects with a lead 20 from an alternating current source as hereinafter described. Hence, a potential may be supplied to the rotor plates through the shaft 16 on which the plates are mounted and its associated conducting parts.

Both of the condenser plates of the rotor are arcuate in form and, in the embodiment illustrated, have surfaces which conform to sectors of a cylinder. The primary, curved condenser plate 2 is supported on an arm 21 which is fixed to shaft 16 in any suitable manner such as by set screws (not shown) passing through the hub 22. Hub 22 is also provided with a slotted arm 23 extending therefrom in diametrically opposite relation to arm 21 and on which is mounted a mass 24. The mass 24 may be adjusted radially of arm 23 and secured in adjusted position by the bolt 25.

Plate 2, as illustrated, is rotatably supported at the center of the formation of circumferentially spaced stator plates 4 to 7, inclusive. These stator plates are also arcuate in form and are provided with surfaces of the form of sectors of cylinders, said surfaces being arranged to cooperate in radially spaced relation to the similarly curved plate 2 of the rotor. Each of the spaced and electrically insulated stationary plates 4 through 7 inclusive has a separate connection for a lead such as indicated at 26 in Fig. 1, and at 26, 27, 28 and 29, respectively, in Fig. 2. The plate 2 is preferably of such circumferential length as to extend approximately throughout 90° as clearly shown in Fig. 2.

Our improved condenser also includes a second or secondary movable plate 3 which is preferably disposed with the radially extending center line or axis thereof in substantially perpendicular relation to the radially extending center line or axis of the primary plate 2 as shown in Fig. 2, both plates being rotatable in this fixed angular spacing with the shaft 16. Plate 3 is supported on an arm 30 which is secured to shaft 16 and also includes an adjustable counter-balancing mass 31 located on the slotted portion of arm 32 which extends diametrically on the opposite side of the hub 33 from arm 30. The secondary plate 3 cooperates with a plurality of vertically-extending strip pieces or trimmer plates which, in the embodiment herein illustrated, are divided into groups, each group being integral, respectively, with the relatively stationary plates 4 through 7 inclusive, the trimmer plates forming a portion of each of the large condenser plates. In broader terms, the stator of the condenser also includes a plurality of groups of condenser plates, each group being electrically connected respectively with one of the condenser plates 4 through 7. For example, the group of plates which includes the plates 34 is electrically connected with plate 4, plates 35 are connected with plate 5, plates 36 are connected with plate 6 and plates 37 are connected with plate 7. The strips or plates are arranged in generally parallel relation with respect to each other to lie along the elements of a surface of a cylinder and the parts thereof extending above the lower plates 4 to 7 cooperate with the secondary plate 3 of the condenser rotor.

In the embodiment of our invention herein illustrated, the upwardly extending, strip pieces or condenser plates are flexible so that the spacing between the individual strips and the rotor plate 3 with which each cooperates may be adjusted by means such as the adjusting screws 38, which are threaded in the side walls of housing 13. The limiting positions in which the respective plate strips may be set by the adjusting screws is shown by the dot-dash line positions 34a and 34b or 36a of these strips in Fig. 1, it being understood that normally each of the yieldable strips is located in a position in which it is farthest removed from the cooperating condenser plate 3, as in position 34b.

Preferably, as clearly shown in Fig. 2, the rotor plates 2 and 3 are of unequal peripheral length, plate 2 being of greater extent and extending substantially throughout 90 degrees of arc while the plate 3 preferably extends not in excess of the total circumferential width of three of the strip plates. With this construction, rotor plate 2 cooperating with the stator plates 4 through 7 serves as the primary means for controlling the balance of the circuits associated therewith while the plate 3 of the rotor in combination with the adjustable strip pieces of the stator serves a vernier function in correcting for errors in the compass system. In other words, with our improved condenser construction, the relative capacities of the respective balancing circuits may be controlled by adjustment of the screws 38 and the associated strip pieces for particular relative positions of stator and rotor plates so that the resultant potentials supplied to the crossed coils of a repeating device are corrected where necessary, and the device may be adjusted closely to repeat the angular position of the primary movable plate 2 through the entire 360 degrees of its movement relative to the stator plates.

In the illustrated embodiment of our invention, the angular position of the shaft 16 and the rotor plates 2 and 3 is determined by permanent magnets 39 which are mounted thereon, the magnets being magnetically coupled with and positioned by the magnets 9 of the compass.

In use, the compass position repeating device operates as follows: With the compass sensitive element pointing in a due north position, for example, the plate 2 of the condenser rotor may be so located as shown as to extend over equal portions of the two adjacent but relatively spaced stationary plates 6 and 7, each of which is connected to a separate balancing circuit. Under these circumstances, the capacities in the respective balancing circuits are equal with the result that the magnetic fields established by the outputs of said circuits respectively feeding, for example, the crossed coils of a repeater are also equal so that the rotor which may be a permanent magnet rotor of the repeater will be positioned midway between the two coils. Any shift or movement of the compass-controlled condenser rotor will vary the relative capacity in the separate balancing circuits in such a way as to change the magnetic flux of the crossed coils resulting in corresponding movement of the rotor. Sufficient movement of the compass instrument with respect to the sensitive element thereof as to bring the movable plate 2 opposite either or both of the stationary plates 4 and 5 will reverse the polarity of the associated crossed coils of the repeater, and cause the position-repeating rotor thereof to follow the movement of the compass throughout its complete 360 degrees of angular travel. The movements of the oscillatory north-seeking sensitive elements 9 of the compass instrument are consequently repeated by the rotor of the repeating means.

From the foregoing, it will be observed that the rotor plate 2 of the condenser in cooperation with the stator plates 4 through 7 will effect an operation of the repeater to reproduce the direction indication afforded by the north-seeking magnets of the compass. Additionally, however, the second rotor plate 3, which is angularly disposed with respect to plate 2 with their radially extending center lines approximately 90 degrees apart, operates in conjunction with the adjustable strip pieces to provide further control over the repeater. These strip pieces are adjustable to vary the capacitance across each thereof and the rotor plate 3 so that for given positions of the rotor the relative spacing between the strip pieces and plate 3 may be adjusted thereby varying the capacitance values in either or both balancing circuits for these given positions. Hence, the strip pieces may be adjusted to correct for lag in the repeater system or to correct for errors which may occur only in certain zones which may be of limited extent of travel only of the compass rotor and throughout 360 degrees of movement thereof. The condenser, therefore, of our invention is characterized by the fact that it is particularly adapted for use as a compass pick-off in a repeater compass system since it affords adjustments of such character that the repeater will faithfully and closely reproduce the direction indications afforded by the magnetic compass. However, our condenser is not necessarily limited in its use as a pick-off for a magnetic compass but may be used as a pick-off with any desired instrument or reference member. For a more complete description of the manner in which the condenser pick-off of our invention may be connected in a repeater system, attention is directed to our said United States Patent No. 2,363,500.

It will be observed that the condenser plates 4 through 7 are arranged concentric with the rotor of the condenser and the pivotal support for the compass magnets and that the rotor plate 2 is spaced substantially equi-distantly from the respective stator plates with which it cooperates. However, the stator and rotor plates, when directly connected with the sensitive elements of the compass, may have cooperating spherical surfaces so that a dipping movement of the compass card or sensitive elements of the compass will not produce any capacity change in the electric circuits associated with the plates. It will be clear that changes in capacity in the balancing circuits employed in a compass repeater system should result only from movement of the compass magnets 9 in a substantially horizontal plane.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A capacity pick-off for use with a member rotatable throughout 360° of angular movement, said pick-off comprising a stator and a rotatably mounted rotor adapted to rotate with said member and relative to said stator, said stator including a plurality of electrically separate stator plate elements arranged in relatively spaced relation to each other and in cooperative relation to said rotor and a plurality of groups of stator trimmer plates, each group being arranged in spaced relation to each other and in cooperable relation to said rotor and the trimmer plates of each group being relatively movable toward and away from said rotor, and means for separately adjusting each of said stator trimmer plates, each of said plate element groups being electrically connected with respective ones of said first-mentioned stator plate elements, said rotor including a pair of plate elements arranged respectively to cooperate one with said first-mentioned stator plate elements and the other with said stator trimmer plate groups; and said rotor and stator being so constructed, correlated and relatively arranged that said rotor plates will simultaneously cooperate respectively with a stator plate element and a group of stator trimmer plates which are electrically separate, the ratio of angular extent in the direction of rotation of the rotor plate cooperating with said trimmer plate groups to the angular extent of a group being materially less than the ratio of similar angular extent of the other rotor plate to that of a stator plate element.

2. A capacity pick-off for use with a member rotatable throughout 360° of angular movement, said pick-off comprising a stator and a rotatably mounted rotor adapted to rotate with said member and relative to said stator, said stator including a plurality of electrically separate stator plate elements arranged with their side edges extending in the direction of the axis of rotation of said rotor and in circumferentially, substantially equally spaced relation about said rotor, a plurality of terminal means for respectively connecting said plate elements in an external circuit, and a plurality of groups of stator trimmer plates, each group being arranged in circumferentially, substantially equally spaced relation about said rotor and the trimmer plates of each group being relatively movable toward and away from said rotor, and means for separately adjusting each of said stator trimmer plates, each of said plate element groups being electrically connected with respective ones of said first-mentioned stator plate elements, said rotor including a pair of circumferentially spaced plate elements arranged to rotate in fixed angular relation to each other and respectively to cooperate one with said first-mentioned stator plate elements and the other with said stator trimmer plate groups, and said rotor and stator being so constructed, correlated and relatively arranged that said rotor plates will simultaneously cooperate respectively with a stator plate element and a group of stator trimmer plates which are electrically separate, the ratio of angular extent in the direction of rotation of the rotor plate cooperating with said trimmer plate groups to the angular extent of a group being materially less than the ratio of similar angular extent of the other rotor plate to that of a stator plate element.

3. A capacity pick-off of the character recited in claim 1, in which the rotor plate elements are arranged to rotate in fixed relation to each other.

4. A pick-off of the character recited in claim 2 in which one rotor plate and the said first-mentioned stator plate elements, cooperating therewith, and the zones occupied by the respective groups of stator trimmer plates are all of substantially the same size order in peripheral length, while the other rotor plate is of a materially lesser peripheral length.

5. A capacity pick-off of the character recited in claim 1 in which the plate elements of the stator and rotor have cooperating surfaces in the form of sectors of cylindrical surfaces arranged about a common center.

6. A capacity pick-off of the character recited in claim 2 in which the stator and rotor plate elements have cooperating surfaces in the form of sectors of cylindrical surfaces arranged about a common center.

7. A capacity pick-off of the character recited in claim 1 in which each group of stator trimmer plates is respectively included within the same angular space about the axis of rotation of said rotor with one of said stator plate elements and is electrically connected thereto, and the two rotor plates are rotatable in fixed, relatively 90° angularly spaced relation.

8. A capacity pick-off of the character recited in claim 2 in which each group of stator trimmer plates is respectively aligned in the direction of the axis of rotation of said rotor with a stator plate element and is electrically connected thereto, and the two rotor plates are rotatable in fixed, relatively 90° angularly spaced relation.

LESLIE F. CARTER.
FRANCIS WEST, JR.

REFERENCES CITED

The following references are of record in the file of this patent:

UNITED STATES PATENTS

| Number | Name | Date |
|---|---|---|
| 2,244,023 | Sauer | June 3, 1941 |
| 2,164,165 | Rodgers | June 27, 1939 |
| 2,309,455 | Herzog | Jan. 26, 1943 |
| 2,052,316 | Sagle | Aug. 25, 1936 |
| 2,277,027 | West | Mar. 24, 1942 |
| 2,193,500 | Usselman | Mar. 12, 1940 |